Figure 1:
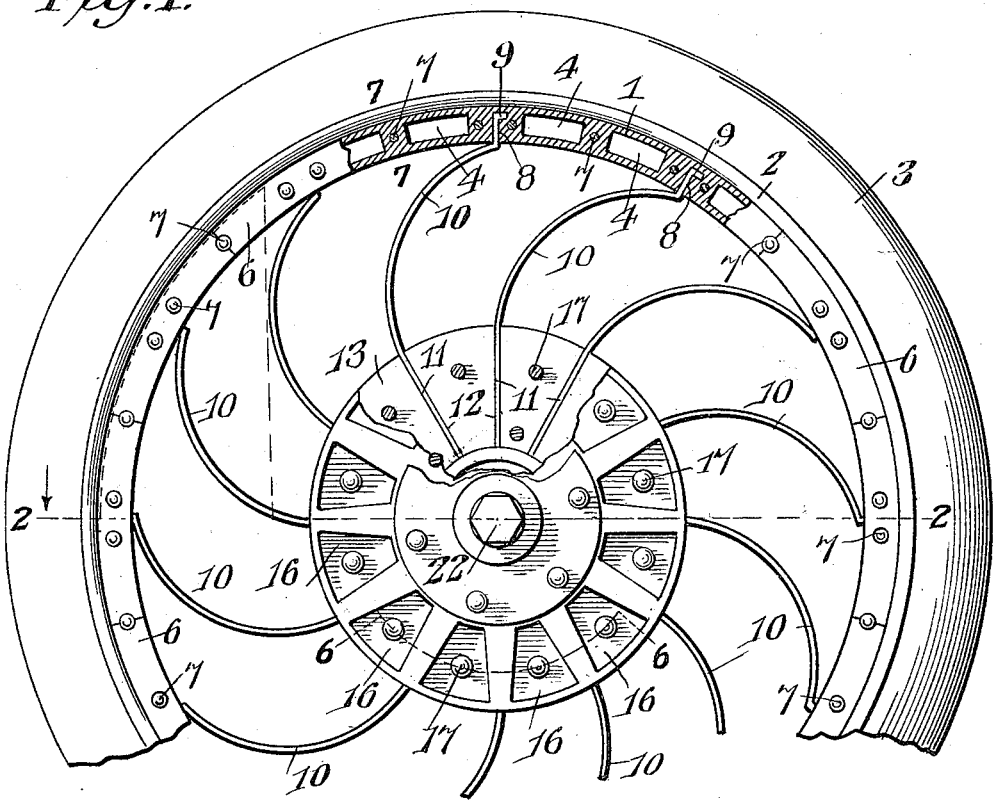

W. GEBHARDT.
SPRING WHEEL.
APPLICATION FILED AUG. 6, 1912.

1,143,183.

Patented June 15, 1915.
2 SHEETS—SHEET 1.

WITNESSES
Jas. K. McCathran
F. T. Chapman

William Gebhardt, INVENTOR
BY
C. G. Siggers
ATTORNEY

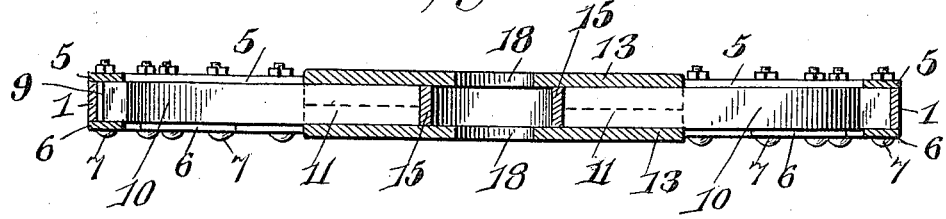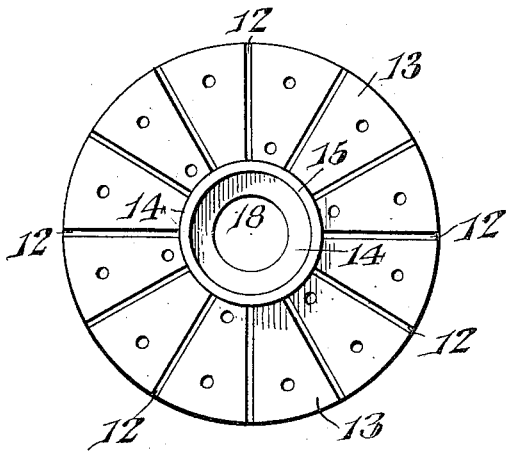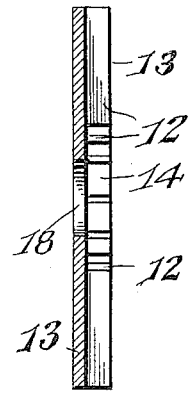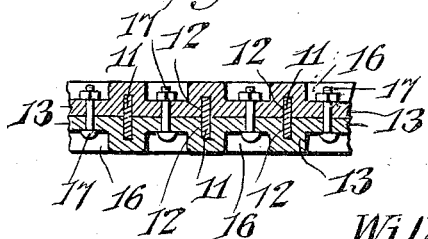

UNITED STATES PATENT OFFICE.

WILLIAM GEBHARDT, OF SAN ANTONIO, TEXAS.

SPRING-WHEEL.

1,143,183. Specification of Letters Patent. Patented June 15, 1915.

Application filed August 6, 1912. Serial No. 713,692.

*To all whom it may concern:*

Be it known that I, WILLIAM GEBHARDT, a citizen of the United States, residing at San Antonio, in the county of Bexar and State of Texas, have invented a new and useful Spring-Wheel, of which the following is a specification.

This invention has reference to improvements in spring wheels, and its object is to provide a wheel which may replace the inelastic wheels commonly used in connection with automobiles, and which are usually made of wood.

Pneumatic tires such as are employed in connection with automobiles are frequently of short life because they are run comparatively soft, and many tire manufacturers guarantee tires only when they are maintained pumped up hard. When such air pressure within the tire is employed as is expected by the tire manufacturers much of the elasticity of the tire is lost and the automobile is subjected to shocks and jars in the parts not protected by springs and which tend to produce crystallization of the axles.

The present invention is designed to overcome the objection to a hard pumped tire by providing a degree of elasticity between the hub and the rim of the wheel which will compensate for the lack of elasticity in the tire.

The present invention, therefore, has to do with the production of a spring wheel in conjunction with which the ordinary pneumatic tire is employed, but with which the tires may be pumped up very hard and all the advantages of the high pressure within the tires may be utilized even to the extent of prolonging the life of the tires fully twenty-five per cent., while at the same time the life of the vehicle is prolonged and the riding is made much easier than would otherwise be the case. Moreover, great flexibility of the front of the vehicle without interference with the ease of steering is obtained, for by the present invention while the wheel is elastic, it is at the same time very rigid against any side displacement with reference to the axis of rotation.

In accordance with the present invention there are provided flat steel spring spokes of sufficient width axially to give the requisite stiffness against side motion, while at the same time these spokes will yield to any force tending to move the rim of the wheel toward the axis of rotation of the wheel. The structure is such that the spokes are readily applied or removed, wherefore repairs may be quickly made, and, moreover, there is slight liability of breakage of the spokes, while the cost of the production of the wheel will not exceed that of a wooden wheel. Moreover, the wheel of the present invention may be applied directly to the axles of existing automobiles and any type of rim may be applied to the wheel of the present invention, so that a wooden wheel may be converted into a spring wheel with no further cost than the substitution of the rim, hub and spokes of the wheel of the present invention for the like parts of the ordinary wooden automobile wheel.

The invention will be best understood from a consideration of the following detailed description, taken in connection with the accompanying drawings forming a part of this specification, with the further understanding that while the drawings show a practical embodiment of the invention which has proven successful in operation, the invention is susceptible of other practical embodiments, wherefore it is not confined to any strict conformity with the showing of the drawings, but may be changed and modified so long as such changes do not mark any material departure from the salient features of the invention.

Figure 2:
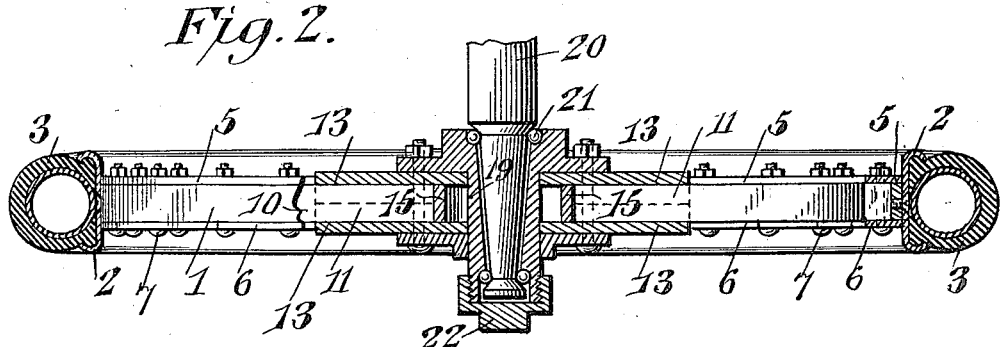

In the drawings:—Figure 1 is an elevation of a wheel constructed in accordance with the present invention, with some parts broken away and other parts shown in section. Fig. 2 is a section on the line 2—2 of Fig. 1. Fig. 3 is a diametric section of the wheel of Fig. 1 with the axle, rim and tire omitted. Fig. 4 is an inner face view of one of the hub plates. Fig. 5 is a diametric section of the hub plate of Fig. 4 with a positioning ring therein omitted. Fig. 6 is a section on the line 6—6 of Fig. 1. Fig. 7 is a section on the line 7—7 of Fig. 1 with the rim and tire omitted.

Referring to the drawings, there is shown a felly 1 to which may be attached a rim 2 of any approved pattern designed to receive a pneumatic tire 3 of any desired construction, the rim and tire not entering into the present invention, and consequently needing no detail description, since the invention is not confined to any particular form of rim or tire.

The felly 1 may be in the form of a casting of aluminum, or steel stamping, or may be made of any suitable material, preferably metal, with openings 4 at suitable intervals to contribute to the lightness of the felly without sacrifice of strength. Applied to one side of the felly 1 is a flat ring 5 which may be continuous from end to end, while on the other side of the felly there are applied segmental plates 6 sufficient in number and extent to conform to the ring 5 so that the ring 5 and plates 6 cover both sides of the felly. This ring and the segmental plates are held to the body of the felly by bolts 7 which may traverse webs formed between the passages 4, and when the plates are in place the passages 4 become closed cells.

At proper intervals in the felly the web portions are formed with recesses 8 each terminating in an angle extension 9. The recess 8 and its extension 9 may pass entirely through the felly in the direction of the axis of rotation, and is designed to receive a correspondingly shaped end of the spoke 10, which latter is formed of a flat spring strip appropriately bent at one end to fit the recesses 8 and its continuation 9, and from thence bent into a quadrant and merging at the other or inner end into a straight portion 11 substantially tangent to the curve of the quadrant which when the spoke is installed in the wheel is radial to the axis of rotation.

The radial portions 11 of the spokes are lodged in radial grooves 12 formed on the inner faces of two like hub plates 13, each further formed with a central recess 14 in which is lodged a ring 15 forming an abutment for the inner ends of the portions 11 of the spokes, so as to position these ends. The hub plates are also provided with external recesses 16 forming pockets in which are lodged bolts 17 connecting the plates and also serving to correspondingly lighten the structure without material decrease in strength. When the two hub plates are in position the ends 11 of the spokes extend about equally into each hub plate and are locked in the hub against accidental displacement. The hub plates are formed with alined central openings 18 through which may be extended the metal hub 19 of the auto wheel, the hub plates interior to the recesses 16 occupying the position in the metal hub of the automobile usually occupied by the spokes in the wooden wheel.

No attempt is made to illustrate any particular hub structure and the showing of the drawings in this respect is to be considered simply as indicative without confining the invention to any particular structure of the parts which do not enter into the present invention. Importance, however, is attached to the fact that the annular flanges on the metal hub, one of which is fixed and the other of which is removable, as is customary, are smaller in diameter than the hub plates and bear against the same, and said flanges are connected by bolts which traverse the hub plates at points nearer the center thereof than the bolts 17. In the drawing an axle is indicated at 20, anti-friction bearings at 21, and the usual exterior cap for the hub at 22. The quadrantally curved portion of each spoke extends from the felly to the hub, being substantially tangential to the felly where entering it, while the straight end portions are substantially radial to the felly and to the hub.

In the actual operation of the wheel the hub ends of the springs lead, while the felly ends of the springs trail, and consequently the torsional effect of the drive is to straighten out the springs which, of course, is resisted by the felly, wherefore the springs are quite rigid with respect to the driving forces. When, however, the wheel meets an obstruction the effect of which would be neutralized by a comparatively soft tire, but the shock of which with a tire well pumped up would be transmitted to the body of the vehicle, the springs will yield in a direction to cause the rim of the wheel to approach the axle, or the axle to approach the rim of the wheel at some point, certain of the springs bending compressively and others bending by elongation or straightening, and the shock or jar is therefore taken up by the springs and is not transmitted to the vehicle. The bending of the springs is intermediate of the ends where the bending is insufficient to cause any deterioration of the springs, while no material bending takes place either at the hub plates or at the rim, and these parts are not put under such strain as to cause breakage of the springs.

Of course, the springs may sometimes break, in which case it is but necessary to remove the outer hub plate and the proper section 6 when the broken spring may be readily removed and a new one inserted with but little loss of time, and on the replacing of the respective hub and felly plates the wheel is as efficient as before.

All the metal parts except the spring spokes may be made of aluminum and the structure is especially adapted for, though not confined to, manufacture of such metal.

What is claimed is:—

1. A spring wheel comprising a felly, a hub, and leaf-spring spokes, the felly having substantially radial recesses, and the hub being provided with substantially radial seats, and each spoke having its outer end formed with a straight portion which is radial to the wheel to fit in the recesses of the felly, and at the other end formed into a straight portion also radial to the wheel to fit in the seats of the hub, the spoke between the two straight portions outside the hub and felly being formed into a curve which is equal to a quadrant and extends from the felly to the hub and is substantially tangential to the felly where it joins with the straight portion seated in the felly, all the spokes curving in the same direction throughout the wheel.

2. A spring wheel comprising a felly having openings separated by transverse webs, said webs being provided with radially-disposed recesses which lead from the inner periphery of the felly and terminate in angle extensions, said recesses and their extensions being cut transversely through the felly so as to be open at each side thereof, a ring applied to one side of the felly over said openings and recesses, segmental plates applied to the other side of the felly and closing said openings and recesses, bolts traversing the webs and connecting the plates, leaf-spring spokes having their outer ends entering the recesses and formed with bent extremities to engage the angle extensions of the recesses, a hub, and means for connecting the inner ends of the spokes to the hub.

3. A spring wheel comprising a felly, a hub, and leaf-spring spokes, said hub being formed of two plates each with radial grooves matching those of the other, said grooves being adapted to receive the straight inner portions of the spokes, said hub plates having external spaced recesses forming pockets, the grooves on the inner sides of the plates coinciding with the spaces between the external recesses, bolts connecting the plates at the recesses, and a separate ring forming an abutment for the inner ends of the spokes, said ring being seated in circular recesses provided on the inner sides of the hub plates and joining with the inner ends of the radial grooves.

4. A spring wheel comprising a felly, a hub, and leaf-spring spokes, said hub being formed of two plates each with grooves matching those of the other, said grooves being adapted to receive the inner portions of the spokes, bolts connecting the plates at the spaces between the grooves, said hub plates having alined central openings through which is removably passed the metal hub of an automobile wheel, the flanges on said metal hub being of less diameter than the hub plates and bearing against the outer faces of the same, and separate bolts connecting the flanges of the metal hub and passing through the hub plates so as to clamp the latter between the flanges of the hub, said last-mentioned bolts traversing the hub plates nearer the center thereof than the first-mentioned bolts.

In testimony, that I claim the foregoing as my own, I have hereto affixed my signature in the presence of two witnesses.

WILLIAM GEBHARDT.

Witnesses:
C. A. BARNES, Jr.,
L. H. BOWDEN.